G. I. ROCKWOOD.

DRY PIPE VALVE.

APPLICATION FILED FEB. 28, 1919.

Reissued Oct. 28, 1919.

14,746.

2 SHEETS—SHEET 1.

WITNESSES:

C. F. Nisson

L. T. Hawley

INVENTOR.

George I. Rockwood

BY

Smithgall & Smithgall

ATTORNEYS.

G. I. ROCKWOOD.
DRY PIPE VALVE.
APPLICATION FILED FEB. 28, 1919.
Reissued Oct. 28, 1919.
14,746.
2 SHEETS—SHEET 2.
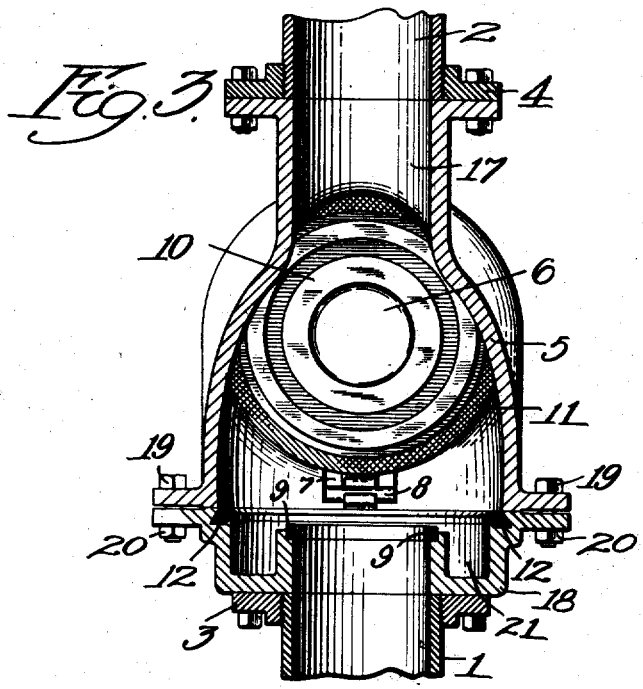
WITNESSES:
C. F. Mason
C. T. Hawley
INVENTOR.
George I. Rockwood
BY
Smith & Smith
ATTORNEYS.

UNITED STATES PATENT OFFICE.

GEORGE I. ROCKWOOD, OF WORCESTER, MASSACHUSETTS.

DRY-PIPE VALVE.

14,746. Specification of Reissued Letters Patent. Reissued Oct. 28, 1919.

Original No. 929,710, dated August 3, 1909, Serial No. 346,706, filed December 7, 1906. Application for reissue filed February 28, 1919. Serial No. 279,908.

*To all whom it may concern:*

Be it known that I, GEORGE I. ROCKWOOD, a citizen of the United States, residing at Worcester, in the county of Worcester and Commonwealth of Massachusetts, have invented a new and useful Improvement in Dry-Pipe Valves, of which the following is a specification, accompanied by drawings, forming a part of the same, in which—

Fig. 3 is a vertical sectional view on the plane of the broken line 3—3 of Fig. 1, looking in the direction of the arrow *a*, but showing the valve in its raised position.

Similar reference figures refer to similar parts in the different views.

Figure 1:
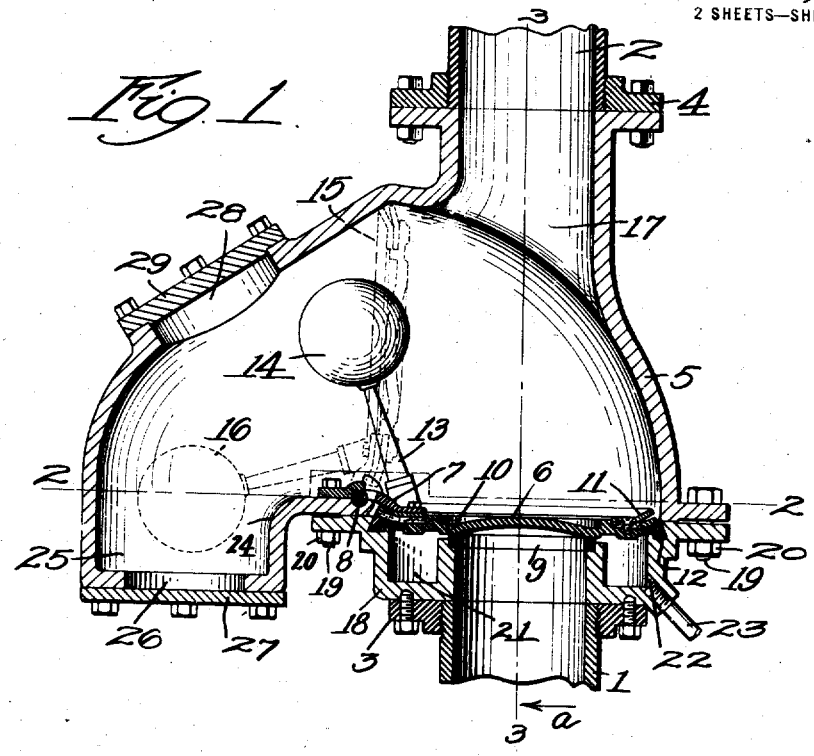
Figure 1 represents a side elevation of my improved dry pipe valve shown in central vertical sectional view with the valve closed.

The object of my present invention is to provide an improved dry pipe valve adapted for use in a system of automatic sprinklers, said valve being inserted in the water supply pipe to the sprinkler system, by which the pressure of water is resisted by an air pressure in the pipe between the dry pipe valve and the sprinklers, and my invention consists in the construction and arrangement of parts as hereinafter described and pointed out in the annexed claims.

Referring to the acompanying drawings, 1 denotes a pipe leading from a source of water supply under pressure, and 2 a pipe leading to a series of automatic sprinklers. Between the pipes 1 and 2 and connected therewith by flanged connections 3 and 4, or by other suitable means, is a shell 5 forming the case of my improved dry pipe valve. The valve case contains a circular valve plate 6 to which is attached a plate or arm 7 pivoted at 8. The valve case is provided with an annular valve seat 9 of the same diameter as the water supply pipe 1 adapted to receive a depending valve 10 on the under side of the valve plate 6, forming a water valve closing the water supply pipe. The valve plate 6 also carries at its edge a flexible ring 11 forming an air valve contacting with an annular valve seat 12 concentric with the valve seat 9 but of larger diameter. When the valves 10 and 11 are closed, in the position shown in Figs. 1 and 2, the valve chamber and also the space between the valve and the sprinklers is filled with compressed air of sufficient pressure to hold the valve 11 seated, notwithstanding the water pressure in the pipe 1 against the under side of the valve plate. The difference in diameter between the air valve 11 and the water valve 10 enables a given air pressure to withstand a greater water pressure, as the area of the valve plate in contact with the compressed air is greater than the area of the valve plate in contact with water under pressure in the pipe 1. By this means the flow of water is restricted to the pipe 1 and is prevented from flowing through the valve chamber into the supply pipe 2 leading to the sprinklers. The danger of freezing is therefore obviated when the supply pipe 2 and sprinklers are placed in an exposed position.

The valve plate 6 is provided with an arm 13 upon the end of which is mounted a counterweight 14. In the closed position of the valves 10 and 11 the counterweight 14 fails to exert sufficient force to rock the valve plate on its pivot 8 as the center of gravity of the counterweight 14 is arranged nearly in a vertical plane above the pivot so that when the valves are closed the center of gravity of the rocking parts is slightly toward the valve seats relatively to a vertical plane passing through the axis of the pivot or hinge, whereby gravity normally acts to keep the valves on the seats and becomes effective to rock said valves away from said seats after an initial opening movement thereof and long before they are wide open; but if for any reason the air pressure in the valve case should be destroyed, the pressure of water in the supply pipe 1 will lift the valve plate 6 and rock it into position shown by the broken lines 15, carrying the counterweight 14 into the position denoted by the broken lines 16. During this swinging movement of the valve plate 6 the counterweight 14 exerts a constantly increasing force which soon becomes sufficient to raise the valve plate into its lifted position independently of the pressure of water beneath it. That section of the valve case 5 through which the valve plate travels in its rocking movement between its closed and its wide open position presents a circular inner wall upon any given radial section which passes through the axis of the hinged valve plate 6, and the diameter of this circular inner wall is preferably equal to the outer diameter of the flexible valve ring 11, therefore as the valve rises, the periphery of the flexible ring 11 is in contact with the inner wall of the valve case, so that the entire pressure of the water supply through the pipe 1 is applied to lift the valve plate 6 until its edge reaches the opening 17 communicating with the sprinkler supply pipe 2. At this point in the upward movement of the valve plate the counterweight 14 exerts sufficient force to continue the rocking movement of the valve plate and carry it into its lifted position, as shown by the broken lines 15. The valve seats 9 and 12 are both contained in a single casting 18 interposed between the water supply pipe 1 and the valve case 5, and attached to the latter by means of bolts 19 and nuts 20. By removing the valve seat casting 18 an opening will be formed in the valve case 5 large enough to enable the valve plate 6 to be removed for repairing or other purposes. Between the valve seats 9 and 12 is an annular chamber 21 which is provided with a drip opening 22 closed by a plug 23. That portion of the valve case 5 in which the counterweight 14 swings is extended downward at 24 to provide for the movement of the counterweight 14, and also to provide a sediment chamber 25 having an opening 26 in its bottom, closed by a plate 27 for the removal of any sediment which may accumulate. The case is also provided with a manhole 28 covered by a plate 29 through which the counterweight 14 may be removed.

I deem it preferable to have the edge of the flexible valve ring 11 contact lightly with the inner wall of that portion of the valve case 5 through which the valve ring moves as the valve passes from a closed to an open position; but I do not confine myself to such a construction.

Figure 2:
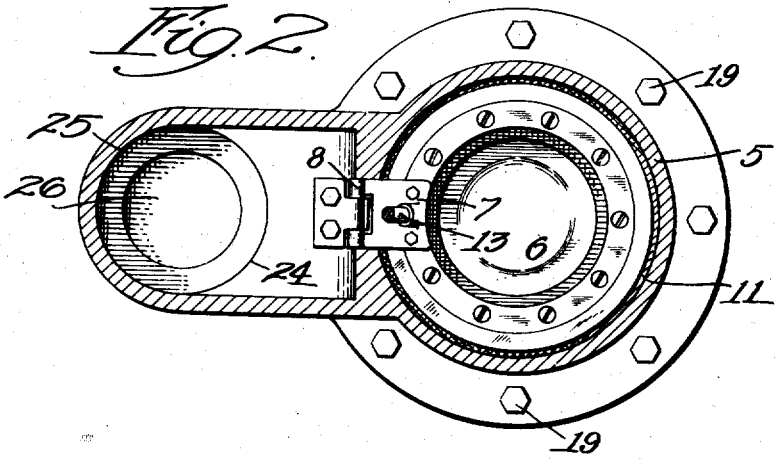
Fig. 2 is a top view shown in horizontal sectional view on line 2—2 of Fig. 1.

It will be noticed that the two valve seats are interposed between the water supply and the pipe leading to the sprinklers, so that in operation all the water passing to the sprinkler system must flow through both of said valve seats. With this arrangement, when the dry pipe valve is called into operation, a slight opening of the water valve 10 will let water into and quickly fill the chamber 21, so that even if the large or air valve 11 sticks, the full pressure of the water supply almost instantly will be applied to the entire valve area, causing both valves to open with more or less of a snap action tending to overcome additionally any sticking or corrosion of the hinge. This quick, positive lifting and separation of the valves from the two seats allows the peculiarly disposed weight of the rocking parts to act so that the movement is continued and the valves are almost instantly rocked to and held in wide open position, as shown in Fig. 1. Thus, by using the particular arrangement of valves and seats specified, in combination with the particular arrangement of the center of gravity of the rocking parts specified, all difficulties are overcome and the dry pipe valve works whenever called upon.

I claim—

1. A dry pipe valve for use in a system of automatic sprinklers, comprising a casing having two valve seats through both of which all the water passing to the system must flow, a valve plate capable of a rocking movement, valves carried by said valve plate fitting said seats and arranged to open by the rocking movement of said valve plate, and means for exerting a force independent of the water supply to rock said valves away from said seats after an initial opening movement thereof.

2. In a dry pipe valve, the combination with a casing having two valve seats interposed between the water supply and the pipe leading to the sprinklers so that all the water passing to the system must flow through both of said valve seats, valves fitting said valve seats, a pivoted valve plate carrying said valves, and a counterweight for said plate arranged in a position above the pivot of said plate so that gravity will become effective to rock said plate after an initial opening movement of the valves.

3. A dry pipe valve for use in a system of sprinklers, comprising a casing having two valve seats through both of which all the water passing to the system must flow, a valve plate capable of a rocking movement, and valves carried by said valve plate fitting said seats and arranged to open by the rocking movement of said valve plate, and means for counterweighting the parts so that gravity normally acts to keep the valves on their seats and becomes effective to rock said valves away from their seats only after an initial opening movement thereof.

4. In a sprinkler system, a dry pipe valve, comprising a shell or case communicating with said system and having an opening for the admission of water under pressure, a valve for closing said opening, a second valve arranged to be held closed by compressed air in said system, a rocking valve plate carrying said valves, two valve seats with which said valves coöperate and through both of which all the water passing to the system must flow, and means for exerting a force independent of the water supply to rock said valve plate after said plate has been lifted by the excess of the water pressure over the air pressure.

5. A dry pipe valve comprising a shell or case circular in cross section, an opening in said case for the admission of water under pressure, a second opening communicating with a sprinkler system, a rocking valve plate carrying a valve for closing said first opening, and a second valve in contact with the inner circular wall of said case, independent means for rocking said valve plate arranged to be called into operation by the opening of said first valve, and arranged to rock said valve plate out of the passage through said case between said first and second openings after communication has been established between them.

6. In a dry pipe valve, the combination with a rocking valve plate provided with a valve for resisting a water pressure, a flexible valve on the edge of said valve plate, and a shell or case having its inner wall arranged to form a valve seat for the outer edge of said flexible valve to prevent the passage of water in case of the limited or accidental lifting of said valve plate.

7. In a sprinkler system, a dry pipe valve, comprising a shell or case communicating with said system and having an opening for the admission of water under pressure, a valve for controlling the admission of water, a second valve arranged to be closed by compressed air in said system, a member carrying said valves, two valve seats with which said valves coöperate and through both of which all the water passing to the system must flow, and means for exerting a force independent of the water supply normally to keep said valves on their seats and to move said valves away from their seats only after an initial opening movement of the valves is effected by the water pressure acting by reason of a decrease of the air pressure.

In testimony whereof I have hereunto affixed my signature.

GEORGE I. ROCKWOOD.

Witnesses:

C. Forrest Wesson,

Albert E. Fay.